Aug. 27, 1940.　　　　J. B. BAMBENEK　　　　2,212,911
CHAIN LINK
Filed Feb. 20, 1939
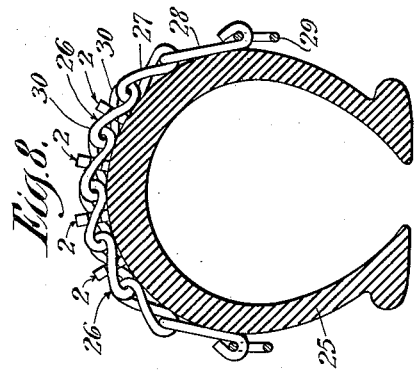
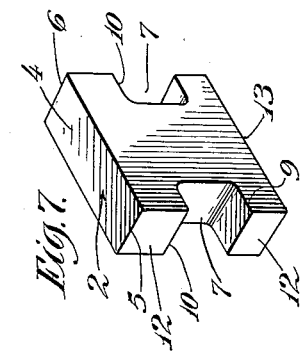
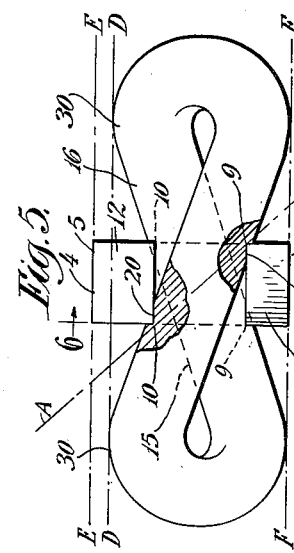
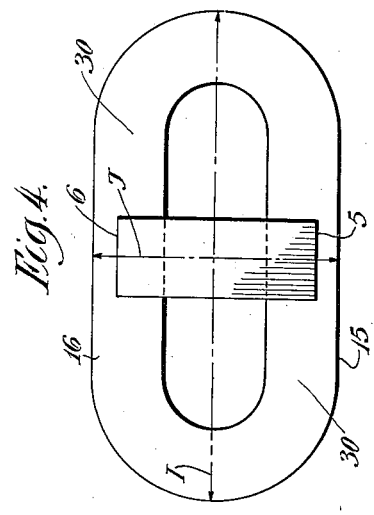
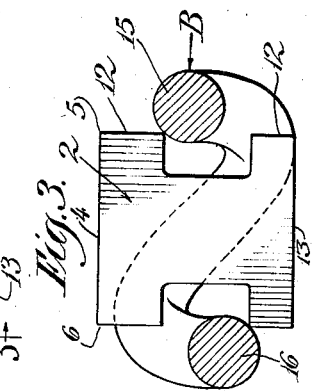
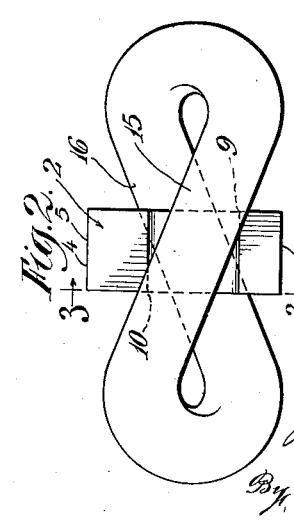
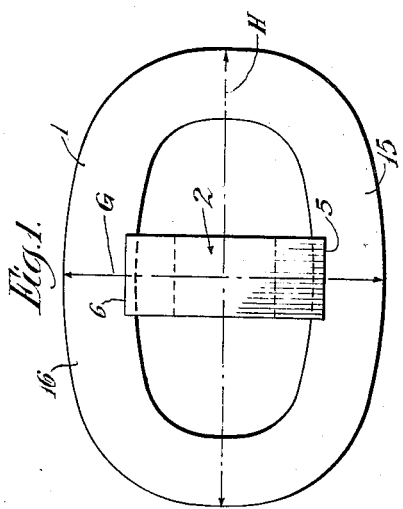
Inventor:
Joseph B. Bambenek
By Harold Olsen
Attorney Patented Aug. 27, 1940

2,212,911

UNITED STATES PATENT OFFICE 2,212,911

CHAIN LINK

Joseph B. Bambenek, Winona, Minn., assignor to Peerless Chain Company, Winona, Minn., a corporation of Minnesota Application February 20, 1939, Serial No. 257,441

8 Claims. (Cl. 152—245)

This invention relates to improvements in traction links for chains for tires, which chains find valuable use as non-skid devices for vehicle wheels. An important object is to increase the wear of the link and therefore the wear of a chain formed from such links. Increased traction is also obtained.

The manufacture of such chain links has presented a number of difficulties, among which is that of the cost of welding the traction reinforcing elements. By the use of this invention the manufacturer is not limited to the welding quality of the steel, as is one who welds his wear and traction-increasing means to the link.

It has heretofore been proposed to merely insert between the sides of a link a metal block or insert and to weld the vertical sides of the block to the inner surfaces of the sides of the links. It has also been proposed to use a metal block or insert having diagonally placed grooves which receive the corresponding diagonally disposed side portions of a twisted link, and in which sides of recesses are parallel with the long axes of the link sides. The connection of these grooved blocks has been accomplished by forging, which requires preliminary heating fo the parts. It has also been proposed to weld a cross-bar to the ground-facing surfaces of the sides of a link, but welding is expensive.

The main object of the present invention is to apply a traction block between a link and to provide a method and means by which this block is held in traction-increasing position, without welding.

Features of the invention include the method by which the calk is attached; the construction of the block per se; the specific character of chain-side receiving grooves of the block wherein the horizontal surfaces of the grooves are substantially perpendicular to the side faces of the greatest area of the block; the proportioning of the grooves of the block and the sides of the links so that after the block is placed within the link and the sides of the links are pressed into the grooves, the corners of the groove will bite into or be strongly frictionally engaged with the chain; broadly, the method by which the block is inserted or by which its attachment is made; all details of construction; and all broader ideas of means inherent in the disclosure.

Objects, features and advantages of the invention are set forth in the description of the drawing, and in said drawing Figure 1 is an enlarged plan showing the parts as before the insert has been secured;

Figure 2 is a side view of Figure 1;

Figure 3 is a vertical cross-section on line 3—3 of Figure 2;

Figure 4 is an enlarged plan view of the completed link;

Figure 5 is a side elevation of Figure 4 with certain parts in section to show the bite between the friction elements of the recess and the side of the link;

Figure 6 is a vertical cross-section on line 6—6 of Figure 5;

Figure 7 is a perspective view of a preferred form of insert; and

Figure 8 is a view showing a number of links of this invention formed into a cross-chain, and the chain applied to a tire to show the relation of the inserts thereto.

In the drawing, the numeral 1 indicates a link of the twisted type, which is initially made wide enough transversely to facilitate introduction of the insert. The ordinary link can, of course, be spread, but I prefer to so initially form the link that the insert can be inserted. Compare dimension line H of Figure 1 with line I of Figure 4. Also compare width, dimension line G of Figure 1 with line J of Figure 4.

The link, so initially formed or spread after forming, can admit of the insertion of a traction-increasing insert element generally indicated at 2 and having the preferred form illustrated in Figure 7. This insert is preferably of rectangular configuration and provides a ground-engaging surface 4 providing digging-in edges 5 and 6 which, as shown in Figure 8, occupy front and rear positions with respect to the direction of movement of a vehicle wheel, when a chain composed of the links of this invention is applied.

Each insert is also provided at each of two opposite sides with recesses 7, in this instance rectangular recesses. Each recess provides for the purpose herein edges 9 and 10 which, as it will be noted, are diagonally disposed with respect to the rectangular side 12. These edges 9 and 10, as will be noted by inspection of Figures 2 and 5, are spaced in a direction lengthwise of the link. Their diagonal relation has been represented by line A—A of Figure 5.

In carrying out the method the link is first formed as previously mentioned, to be wider than the finished link, and then the insert 2 is placed in position as shown in Figure 1. By an inspection of Figure 2 it will be seen that the diagonal sides 15, 16 of the link overlap the corners 9 and 10 as viewed in this figure, so that when the sides of the link are brought from the position of Figures 1 and 3 to the positions of Figures 4 and 6, the elements 9 and 10 are caused to bite or gouge into the metal of the link sides 15 and 16, as indicated somewhat diagrammatically at 20. The insert and the sides are suitably held, as by a suitable jig (not shown) in proper relations while pressure is simultaneously applied to the sides 15 and 16 of the link in the directions indicated by the arrows B—B. The result of such operation is best indicated in Figure 6. The insert 2 is, of course, held by a jig (not shown), and the link is so held as to assure the proper engagement of the parts to obtain the result desired.

By an inspection of Figure 5 it will be seen that each side has been strongly, frictionally engaged with the insert only at the two points 9 and 10. It is not absolutely necessary that the recess be rectangular as shown, although this is a convenient way to form it. All that is necessary is to have elements which are the equivalent of 9 and 10, and which are spaced axially of the link, as shown. There is no intention to be limited to the exact configuration of the insert, although this is a preferred configuration because it lends itself to easy and cheap manufacture, in quantity.

The first six figures of the drawing are enlarged to almost twice their usual size, to better illustrate the method for forming the link (Figures 1, 2 and 3) and for comparison with the completed link (Figures 4, 5 and 6). The illustrations have been slightly exaggerated to more clearly illustrate the bite of the corners of the recesses of the inserts into the metal of the sides of the link. In Figure 2 one side of the link has been shown in front of the corners to correspond with Figure 3, but it will be noted that in Figure 6 the sides of the link have been indented by these corners in approximately the manner shown. It will be understood, of course, that it is difficult to show (except somewhat diagrammatically) the exact mechanical (sometimes almost microscopic) relation of the parts, but it will be noted by reference to Figures 3 and 6 that when the sides of the links are forced inwardly from the position of Figure 3 to the position of Figure 5 a strong frictional, or a biting contact, occurs between the corners or edges of the grooves and the sides of the links only at four points or over four areas, two points on each side, respectively indicated by numerals 9, 10, 9, 10. The metal of the insert may bite into the link, or the link may bite into the insert, or both of these actions may occur simultaneously when the proper force is applied to the sides of the links to press them inwardly from the position of Figure 3. The gist of the invention is the forcible bringing together of the sides of the links with the edges or corners of the insert to secure and prevent slippage of the insert or calk, all without the use of welding. As before stated, the elimination of the welding operation is a valuable feature. The inserts may be formed by stamping or by the extrusion process.

It will be understood that although I have stated above that the edges dig in, the forced engagement alone operating at the four points previously mentioned will accomplish the result so that there is no intention to be entirely limited to the digging in or actual gouging of the metal, although ordinarily this occurs. In any event, the sides of the chain are so related to the corner surfaces of the recesses of the insert that when they are brought from the position of Figure 3 to the position of Figure 5 a strong frictional contact is obtained to hold the insert immovable.

Inasmuch as it is not necessary to weld, longer wearing metals can be used for the inserts. The cost of welding machines is eliminated, and heat is not used, a double advantage.

It is again noted that this is not a forging operation. The metal is not heated, but pressure is simply applied to the cold link as shown in Figure 3 to move the sides inwardly, in contact with the cold insert. The elimination of expensive welding apparatus is in itself a great advantage and, insofar as I am aware, no one has ever before been ble to fasten a lug within a link for my purpose without welding or without an operation in which the metal is heated.

The insert has been shown as rectangular, the recesses have been shown as rectangular and the specific shape of the insert is claimed per se. However, the invention is not entirely limited to the exact shape of the insert because the gist of the invention is the provision of corners or equivalent element which are adapted to bite into or be very forcibly frictionally engaged with the metal of a corresponding side of the link and so arranged that each engages an opposite side of the side of the link. For purposes of manufacture it is, of course, most convenient to make the block exactly as it is shown, that is, to make it rectangular, because the blocks can be formed by punching and cutting flat strip steel or a bar having the cross-sectional configuration of the block can be formed by extrusion and then the blocks can be obtained by cutting the bar transversely. While the invention is broader than this rectangular shape of the insert, yet considering the cheapness of the methods of forming the rectangular inserts, the particular shape is claimed per se.

It will be noted by reference to Figure 5 that the ground-engaging surface 4 of the insert lies outwardly from the ground-facing surface of the link. The level of the latter is indicated by the line D—D, and the level of the former is indicated by the line E—E. On the other hand, the bottom surface or tire-engaging surface 13 of the insert is flush with the line F—F passing through the tire-engaging points of the twisted link.

In Figure 8 the numeral 25 indicates the ordinary automobile tire, and numeral 26 generally indicates the link of this invention. The figure shows a number of these links 26 forming a chain, the terminal link of each chain being an ordinary link which is indicated at 27, and this ordinary link being in turn connected by means of a hook link 28 with the well known side elements 29 of a cross-chain assembly. It will be noted that when the device is applied the digging edges 5 and 6 are arranged at the front and back in relation to the direction of rotation of the wheel and transversely of the wheel.

There is no intention to be limited to the exact dimensions of link or insert, or the exact proportions of the insert to the link. The insert may be proportionately thicker than shown, but it is to be noted that the present invention provides a means by which either a thick or a thin insert can be permanently held in position. As before stated, when no welding is used, as is the case here, the job can be quickly done and harder and stiffer metal can be used so that if the parts are gouged into one another or have bitten into one another, this gouging or biting (or merely a strong frictional contact) secures the insert under all conditions of use of the chain or link.

When the chain is unprotected by the projection of the insert in the relation shown in Figure 5 the chain also wears down quickly at the points 30 when the chain engages the road, and the chain breaks. When welding is not used and the steel insert is made very hard or very much harder than usual, as is here the case, it wears less quickly and therefore acts as a guard for the points 30 of the twisted chain, and thus prolongs the life of the chain.

It will, of course, be understood that the chain is formed before the inserts are applied. After the inserts are secured by the method herein, the entire chain is case-hardened, in a manner well known to this art. Inasmuch as welding is not used, a steel of an analysis can be used which will produce after case-hardening, an extremely hard, tough, wear-resisting chain but this type of steel would be difficult if not impossible to weld as a reinforcing means for the links. By the use of my method and structure longer wear, better reinforcement, improved traction are obtained. The insert protects the link by being first to engage the road and the inserts largely support the weight of the loaded vehicle.

Although in the drawing the outer or ground-engaging part of the insert has been shown as of less width than the overall width of the link, there is no intention to be limited in this regard. This portion of the insert may be extended as shown in dot-and-dash lines of Figure 6 at 31 so that the overall width is the same as the overall width of the completed link.

I claim as my invention:

1. A twisted chain link having therein a rectangular wear-increasing insert having in each of two opposite parallel sides a rectangular recess, each recess receiving one side portion of said link and each recess providing two diagonally related corners, one at each opposite side of and in strong frictional contact with the corresponding side portion of the link, said corners constituting the sole contact points for resisting tipping of the insert about a horizontal axis which is perpendicular to the long axis of the link.

2. A link having a wear-increasing insert having recesses receiving opposite sides of the link, each recess having portions digging into the corresponding side at two points only which lie at opposite sides of the corresponding side of the link, and which are spaced lengthwise of the side.

3. A link having a wear-increasing insert having recesses receiving opposite sides of the link, each recess having corner edge portions digging into the corresponding side at two points only, which lie at opposite sides of the corresponding side of the link and which are spaced lengthwise of the side.

4. A chain link having therein a wear-increasing insert having in each of two opposite sides a recess, each recess receiving one side portion of said link, and each recess providing diagonally related elements, one at each opposite side of and in biting contact with its side portion, said elements biting into said side portions in such manner as to form pars of oppositely faced shoulders respectively crosswise and lengthwise of the link.

5. A chain link having therein a wear-increasing insert which has in each of two opposite sides a recess, each recess receiving one side portion of said link and each recess providing at diagonally opposite corners only, elements which have a strong frictional engagement with the link, said friction elements providing a four-point anchorage for the insert, two points at each side, and with the diagonal relations of the pairs of points at opposite sides, reversed.

6. A twisted chain link having therein a wear-increasing insert which has a rectangular configuration and which has in each of two opposite sides a rectangular recess, whereby cubically formed corners are provided, each recess receiving one diagonal side portion of said link so that only two diagonally opposite cubically formed corners of the recess dig into opposite sides of the side portion of the link.

7. A link having a wear-increasing insert having recesses receiving opposite sides of the link, each recess having portions in strong frictional contact with the corresponding side at two points only which lie at opposite sides of the corresponding side of the link and which are spaced lengthwise of the link.

8. A link having a wear-increasing insert having recesses receiving opposite sides of the link, each recess having portions in strong frictional contact with the corresponding side at two points only which lie at opposite sides of the corresponding side of the link and which are spaced lengthwise of the link, said recesses being rectangular, and said portions which are in strong frictional contact being constituted by diagonally opposite corner edges of the recess.

JOSEPH B. BAMBENEK.